United States Patent
Mallette et al.

(10) Patent No.: US 8,657,054 B2
(45) Date of Patent: Feb. 25, 2014

(54) FRONT SUSPENSION AND SKI ASSEMBLY FOR A SNOWMOBILE

(75) Inventors: Bertrand Mallette, Rock Forest (CA); Pascal Gagnon, Valcourt (CA)

(73) Assignee: Bombardier Recreational Products Inc., Valcourt (CA)

(*) Notice: Subject to any disclaimer, the term of this patent is extended or adjusted under 35 U.S.C. 154(b) by 0 days.

(21) Appl. No.: 13/574,063

(22) PCT Filed: Jan. 29, 2010

(86) PCT No.: PCT/US2010/022583
§ 371 (c)(1),
(2), (4) Date: Oct. 3, 2012

(87) PCT Pub. No.: WO2011/093880
PCT Pub. Date: Aug. 4, 2011

(65) Prior Publication Data
US 2013/0105237 A1 May 2, 2013

(51) Int. Cl.
*B62B 17/02* (2006.01)
(52) U.S. Cl.
CPC .................................. *B62B 17/02* (2013.01)
USPC ........................................................ 180/190
(58) Field of Classification Search
CPC .......................... B62M 2027/026; B62B 17/02
USPC ................ 180/182–187, 190; 280/15, 16, 17
See application file for complete search history.

(56) References Cited

U.S. PATENT DOCUMENTS

| | | | |
|---|---|---|---|
| 5,038,882 A | 8/1991 | Zulawski | |
| 6,199,649 B1 * | 3/2001 | Alanko | 180/190 |
| 6,331,008 B2 | 12/2001 | Cormican | |
| 6,431,561 B1 | 8/2002 | Hedlund | |
| 6,692,009 B2 | 2/2004 | Lemieux | |
| 6,860,352 B2 | 3/2005 | Mallette et al. | |
| 6,942,050 B1 | 9/2005 | Honkala et al. | |
| 6,971,653 B2 * | 12/2005 | Takahiko | 280/28 |
| 7,198,126 B2 | 4/2007 | Vaisanen | |
| 8,037,961 B2 | 10/2011 | Fecteau | |

OTHER PUBLICATIONS

Copenheaver, Blaine R., International Search Report, Mar. 30, 2010, Alexandria, VA, US.

* cited by examiner

*Primary Examiner* — J. Allen Shriver, II
*Assistant Examiner* — Felicia L Brittman
(74) *Attorney, Agent, or Firm* — BCF LLP (57) ABSTRACT

A front suspension and ski assembly for a snowmobile having a right and a left side, each side comprising an upper and a lower arm pivotally connected to the snowmobile frame and a spindle having an upper portion rotatably connected to the upper arm at a first connection point, a mid-portion rotatably connected to the lower arm at a second connection point, and a lower portion to which a ski is pivotally connected. A keel projects from and extends longitudinally along the ground facing surface of the ski, substantially along its outer surface. A runner projects from and extends longitudinally along the ground facing surface of the keel. A straight line extending through the first connection point and the second connection point extends to a point disposed within the ground engaging portion of the runner.

12 Claims, 5 Drawing Sheets

FRONT SUSPENSION AND SKI ASSEMBLY FOR A SNOWMOBILE

FIELD OF THE INVENTION

The present invention relates generally to a front suspension and ski assembly for a snowmobile and in particular to the geometry of a front suspension and ski assembly for a snowmobile.

BACKGROUND OF THE INVENTION

Typically, snowmobiles include two skis at the front for turning the vehicle, each ski being connected to the vehicle through a suspension assembly.

Different type of skis have been used in the prior art but one of the most popular type of skis currently used are "single-keel skis". A "single-keel ski" is a ski that incorporates a single keel projecting from the ground engaging surface of the ski, the keel has a single or double runner(s), usually made of carbon steel with carbide inserts or other suitable hard materials, which run(s) longitudinally along part of the length of the underside of the keel for contacting the ground whenever the snowmobile is driven on hard surfaces.

The ski stance for snowmobiles is determined as the distance (or width) between the two skis. In particular, where a snowmobile is provided with a pair of single-runner skis, which is the more typical example, the ski stance is measured as the distance (or width) between the runners at the bottoms of each ski.

The stability of a snowmobile is affected by at least the two following factors: (i) the ski stance, and (ii) the location of the intersection point between the steering axis of each ski and the ground relative to the point of contact between the ski's runner and the ground. Regarding the first factor, it has been determined that increasing the ski stance directly increases the lateral distance between the center of gravity of the vehicle and the point of contact of the runners on the ground, the runners bearing at least the weight of the front portion of the vehicle. The further the weight-bearing points of the front portion of the vehicle, i.e. the runners, are from the center of gravity of the vehicle, the better will be the stability of the vehicle, even more so when the vehicle is turning, which is described as an improved "turning stability".

On the other hand, it has been determined that the second factor identified above more significantly affects the stability of the vehicle when it is driven in straight line, which is known as the "straight-line stability". When the runner of each ski does not have a contact point with the ground which coincides with the intersection point between the steering axis of the corresponding ski and the ground, the friction between the runner and the ground creates a moment about the steering axis of the ski.

It is currently difficult to simultaneously improve both the turning and the straight-line stability of a snowmobile. Since the distance between the two skis of a snowmobile is limited in various jurisdictions, generally to forty-height (48) inches, the most common way to improve turning stability is to increase ski stance by moving the keel and runner toward the exterior side of the ground engaging surface of each ski. However, since the steering axis of the ski is very often vertical and generally aligned with the center of the ski, widening the ski stance through such displacement of the keel and runner results in the steering axis and the runner not reaching the ground at a common point, and therefore disadvantageously affect the snowmobile's straight-line stability.

U.S. Pat. No. 6,860,352 to Mallette et al. teaches a system using a spindle (the element of the suspension and ski assembly that connects the one or more suspension arms with the ski and defines the steering axis) that facilitates altering the stance of a snowmobile without having to significantly rework or replace the snowmobile's suspension. However, Mallette et al. does not teach a way to align the steering axis such that it reaches the ground at a common point with the runner U.S. Pat. No. 5,038,882 to Zulawski teaches a way to improve straight-line stability by a particular alignment of the front suspension spindles and skis which induces "toe-out" of the skis, but this has no effect on the turning stability of the snowmobile and the keel is still disposed near the centerline of the ski.

U.S. Pat. No. 6,942,050 to Honkala et al. teaches a snowmobile front suspension assembly with a particular disposition of the spindles and suspension arms that improve maneuverability of the snowmobile when obstacles are encountered, but this has no direct effect on neither straight-line or turning stability of the snowmobile.

In view of the foregoing, there is a need for a front suspension and ski assembly design that would reconcile both improved turning and straight-line stability while respecting the various regulations limiting the total width of a snowmobile and therefore the maximum distance between the skis.

SUMMARY OF THE INVENTION

It is an object of the present invention to ameliorate at least some of the inconveniences present in the prior art.

It is another object of the present invention to provide a front suspension and ski assembly for a snowmobile that improves both straight-line and turning stability without having to increase the distance between the skis.

It is another object of the present invention to provide a front suspension and ski assembly wherein the keel and runner of the skis are disposed in the outer surface of the ground engaging surface of the skis and the connections points of the suspension arms with the spindles are disposed such that the steering axis of the skis intersect the point of contact between the skis' runners and the ground.

It is another object of the present invention to provide a front suspension and ski assembly wherein the keel and runner of the skis are disposed in the outer surface of the ground engaging surface of the skis and the connections points of the suspension arms with the spindles are disposed such that the steering axis of the skis intersect a point within the ground surface of the keel between the inner lateral side of the keel and the runner.

It is another object of the present invention to provide a snowmobile implementing an embodiment of the front suspension and ski assembly.

In one aspect, the invention provides a front suspension and ski assembly for a snowmobile having a frame. The front suspension and ski assembly has a right and a left side each comprising an upper arm pivotally connected to the snowmobile frame and a lower arm pivotally connected to the snowmobile frame. Each one of the right and left side of the front suspension and ski assembly also comprises a spindle having an upper portion rotatably connected to the upper arm at a first connection point, a mid-portion rotatably connected to the lower arm at a second connection point, and a lower portion. A ski is pivotally connected to the lower portion of the spindle at a third connection point. The ski has a longitudinally extending centerline, an inner edge, an opposite outer edge, and a ground facing surface facing the ground when the front suspension and ski assembly is in use. The ground facing surface of the ski comprises an inner surface extending longitudinally from the centerline of the ski to the inner edge of the ski and an outer surface extending longitudinally from the centerline of the ski to the outer edge of the ski. A keel projects from and extends longitudinally along the ground facing surface of the ski and is disposed substantially along the outer surface of the ground facing surface of the ski. The keel has an inner lateral side, an opposite outer lateral side, and a ground facing surface. A runner projects from and extends longitudinally along the ground facing surface of the keel. The runner has a ground engaging portion. A straight line extending through the first connection point and the second connection point extends to a point disposed within the ground engaging portion of the runner In an additional aspect, the straight line defines an acute angle with a generally vertical line passing through the second connection point.

In a further aspect, the ski pivots about a first pivot axis extending generally horizontally from the third connection point and the straight line defines an acute angle with the first pivot axis.

In an additional aspect, a lower portion of the spindle connected with the ski has a longitudinal centerline that is generally aligned with the centerline of the ski.

In a further aspect, the upper arm and the lower arm are A-arms.

In an additional aspect, the ski and keel are integrally formed.

In another aspect, the invention provides a front suspension and ski assembly for a snowmobile having a frame. The front suspension and ski assembly has a right and a left side each comprising an upper arm pivotally connected to the snowmobile frame and a lower arm pivotally connected to the snowmobile frame. Each one of the right and left side of the front suspension and ski assembly also comprises a spindle having an upper portion rotatably connected to the upper arm at a first connection point, a mid-portion rotatably connected to the lower arm at a second connection point, and a lower portion. A ski is pivotally connected to the lower portion of the spindle at a third connection point. The ski has a longitudinally extending centerline, an inner edge, an opposite outer edge, and a ground facing surface facing the ground when the front suspension and ski assembly is in use. The ground facing surface of the ski comprises an inner surface extending longitudinally from the centerline of the ski to the inner edge of the ski and an outer surface extending longitudinally from the centerline of the ski to the outer edge of the ski. A keel projects from and extends longitudinally along the ground facing surface of the ski and is disposed substantially along the outer surface of the ground facing surface of the ski. The keel has an inner lateral side, an opposite outer lateral side, and a ground facing surface. A runner projects from and extends longitudinally along the ground facing surface of the keel. The runner has a ground engaging portion. A straight line extending through the first connection point and the second connection point extends to a point disposed within the ground facing surface of the keel between the inner lateral side of the keel and the runner.

In an additional aspect, the straight line defines an acute angle with a generally vertical line passing through the second connection point.

In a further aspect, the ski pivots about a first pivot axis extending generally horizontally from the third connection point and the straight line defines an acute angle with the first pivot axis.

In an additional aspect, a lower portion of the spindle connected with the ski has a longitudinal centerline that is generally aligned with the centerline of the ski.

In a further aspect, the upper arm and the lower arm are A-arms.

In an additional aspect, the ski and keel are integrally formed.

For purposes of this application, terms used to locate elements on the vehicle or their spatial orientation, such as "forwardly", "rearwardly", "front", "back", "rear", "left", "right", "up", "down", "above", and "below", are as they would normally be understood by a rider of the vehicle sitting on the vehicle in a forwardly facing, driving position. The term "longitudinal" means extending from the front to the back. The terms "inner", "outer", "proximal" and "distal" are to be understood with regard to the longitudinal centerline of the vehicle.

Embodiments of the present invention each have at least one of the above-mentioned aspects and/or aspects, but not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where.

DETAILED DESCRIPTION OF PREFERRED EMBODIMENTS

Figure 1:
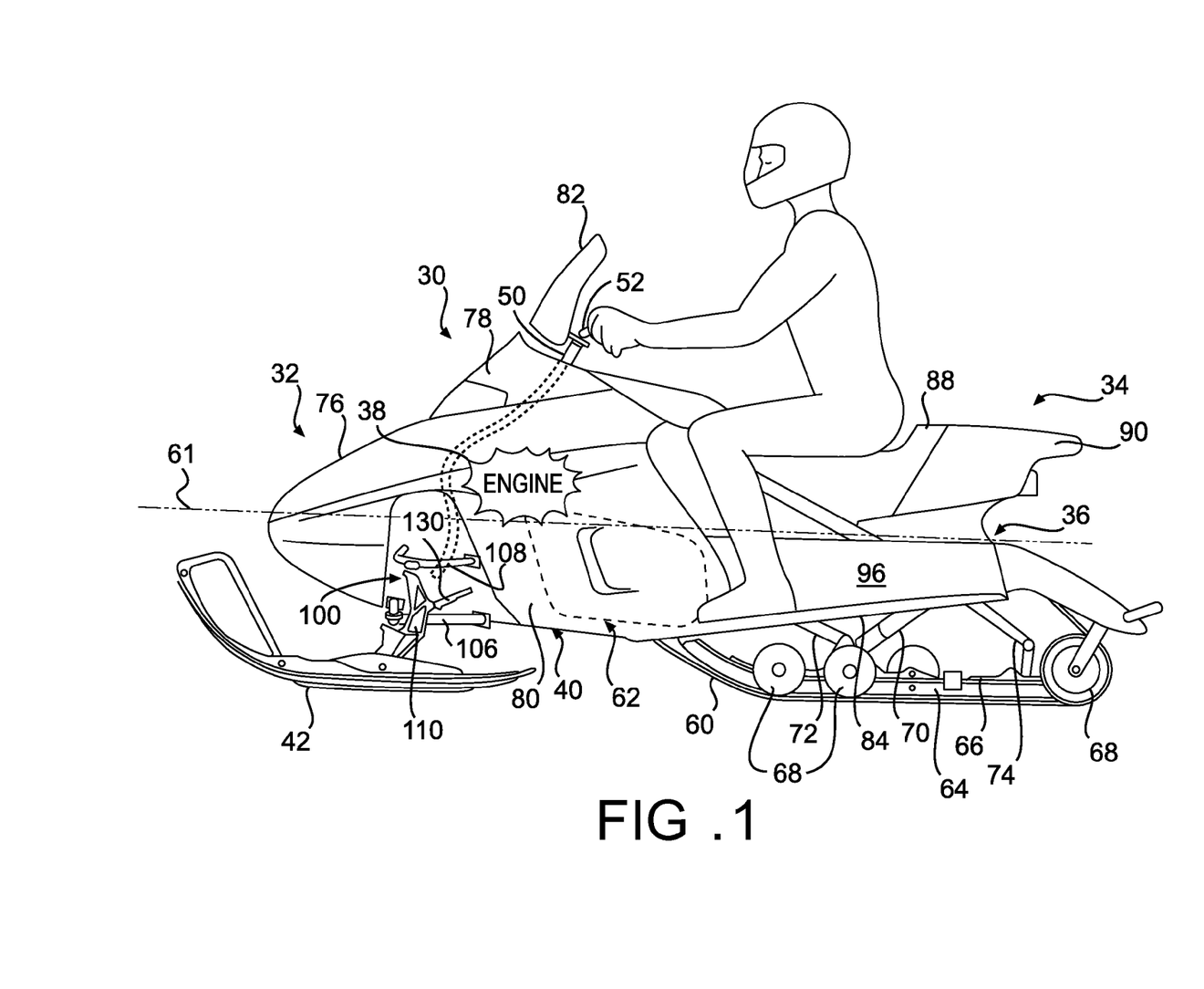
FIG. 1 is a left side elevation view of a snowmobile having a front suspension and ski assembly in accordance with the invention.

FIG. 1 illustrates the general construction of a snowmobile 30 in accordance with a first embodiment of the invention. The snowmobile 30 includes a forward end 32 and a rearward end 34 which are defined consistently with a travel direction of the vehicle. The snowmobile 30 includes a frame 36 comprising an engine cradle portion 40 and a tunnel 96. Tunnel 96 generally consists of an inverted U-shaped bent sheet metal connected to the engine cradle portion 40 which extends rearwardly along the longitudinal axis of the snowmobile 30. While hidden behind a fairing 76, an engine 38, schematically illustrated, provides motive force for the snowmobile 30 and is carried by the engine cradle portion 40 of the frame 36.

Two front skis 42 are attached to the front portion of the frame 36 through a front suspension system 100. The front suspension system 100 generally comprises a double A-arm type suspension, having upper A-arms 108 and lower A-arms 106 on either side of the vehicle linking spindles 110 to the frame 36. The spindles 110 are attached to the skis 42 at their lower ends and rotate left and right therewith. The spindles 110 are also connected to a steering column 50 via steering rods 130. The steering column 50 is attached at its upper end to a steering device such as a handlebar 52 which is positioned forward of a rider and slightly behind the engine 38 to rotate the skis 42, thereby providing directional control of the snowmobile 30. As illustrated in dotted lines, the steering column 50 passes in front of the engine 38. The steering column 50 is designed with a bend (not shown) such that the steering column 50 passes in front and above the engine 38 and clears the engine 38 throughout the range of rotation of the steering column 50 when the handlebar 52 is turned to the right or to the left. Thus, by turning the steering device 52, the steering column 50 rotates, the spindles 110 are pivoted, and the skis 42 are turned to steer the snowmobile 30 in a desired direction.

An endless drive track 60, which provides propulsion to the snowmobile 30, is disposed under the tunnel 96 of the frame 36 with the upper portion of the drive track 60 accommodated within the tunnel 96. The endless drive track 60 is operatively connected to the engine 38 through a belt transmission system 62 which is schematically illustrated by broken lines. The drive train of the snowmobile 30 includes all the components of the snowmobile 30 whose function is to transmit power from the engine to the ground. The endless drive track 60 is mounted to the tunnel 96 via a rear suspension assembly 64. The rear suspension assembly 64 includes rear suspension arms 72 and 74, a pair of slide rails 66 which generally position and guide the endless drive track 60 and idler wheels 68 engaged therewith. Rear suspension arms 72 and 74 connect the slide rails 66 and idler wheels 68 to the tunnel 96 of the frame 36. The slide rails 66 typically include a sliding lower surface made of polyethylene to reduce contact friction between the slide rails 66 and the drive track 60. The rear suspension assembly 64 also includes one or more shock absorbers 70 which may further include a coil spring (not shown) surrounding the individual shock absorbers 70.

At the front end 32, the snowmobile 30 includes an external shell consisting of fairings 76 that enclose and protect the engine 38 and belt transmission system 62 and that can be decorated to render the snowmobile 30 more aesthetically pleasing. Typically, the fairings 76 include a hood 78 and one or more side panels 80 which can be opened to allow access to the engine 38 and the belt transmission system 62 when this is required, for example, for inspection or maintenance. The side panels 80 can be opened away from the snowmobile 30 along a vertical axis, independently from the hood 78, which pivots forward about a horizontally extending axis. A windshield 82, which may be connected either to the fairings 76 or directly to the handlebars 52, acts as wind deflector to lessen the force of the air on the rider when the snowmobile is moving.

A straddle-type seat 88 is positioned atop and mounted to the tunnel 96. At the rear of the straddle seat 88, a storage compartment 90 is provided. A passenger seat (not shown) can also be provided instead of the storage compartment 90. Two footrests 84, generally extending outwardly from the tunnel 96, are also positioned on either side of the straddle seat 88 to accommodate the rider's feet and provide a rigid platform for the rider to stand on when maneuvering the snowmobile 30.

Figure 2:
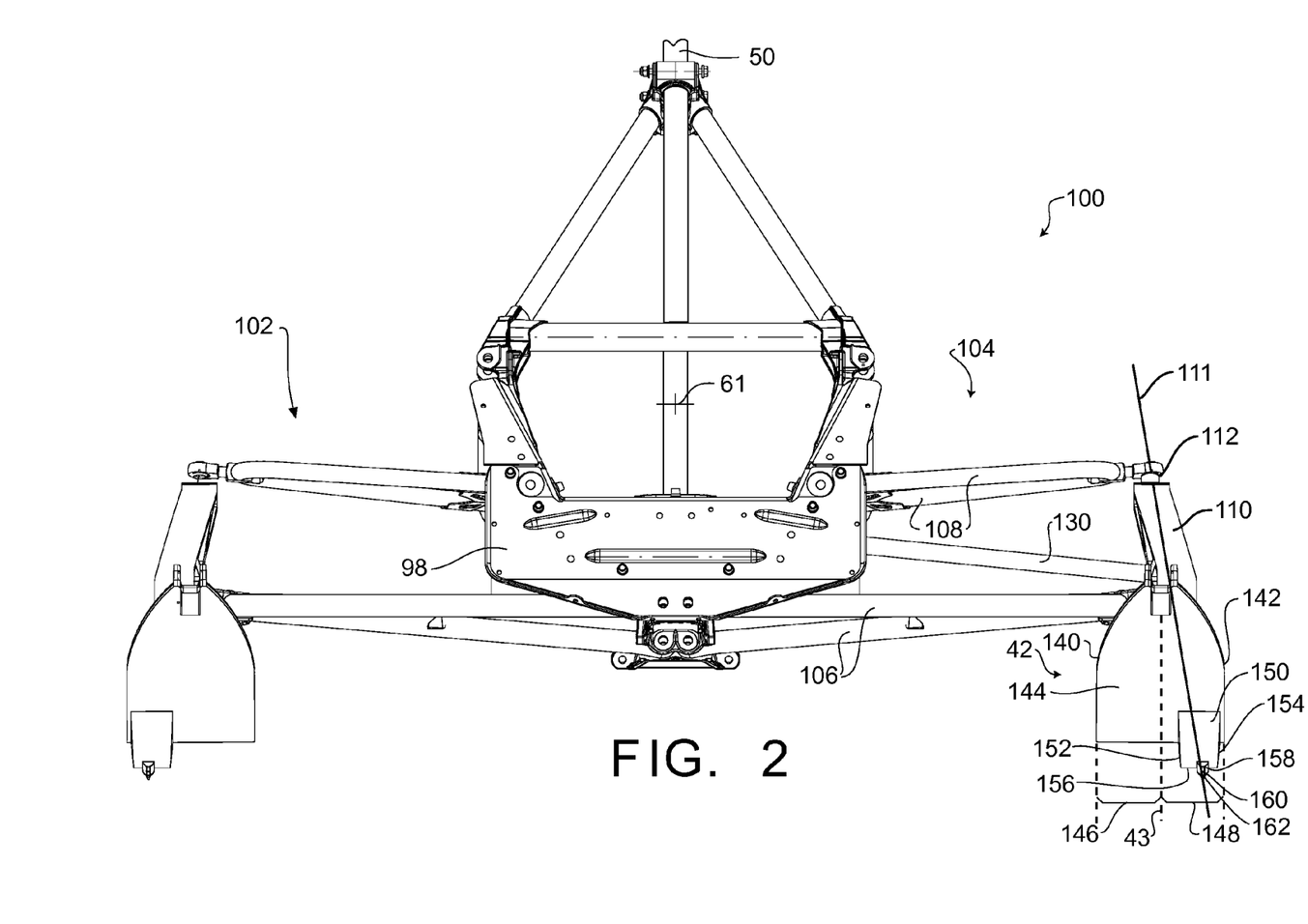
FIG. 2 is a front elevation view of a first embodiment of a frame and front suspension and ski assembly of the snowmobile of FIG. 1.
Figure 3:
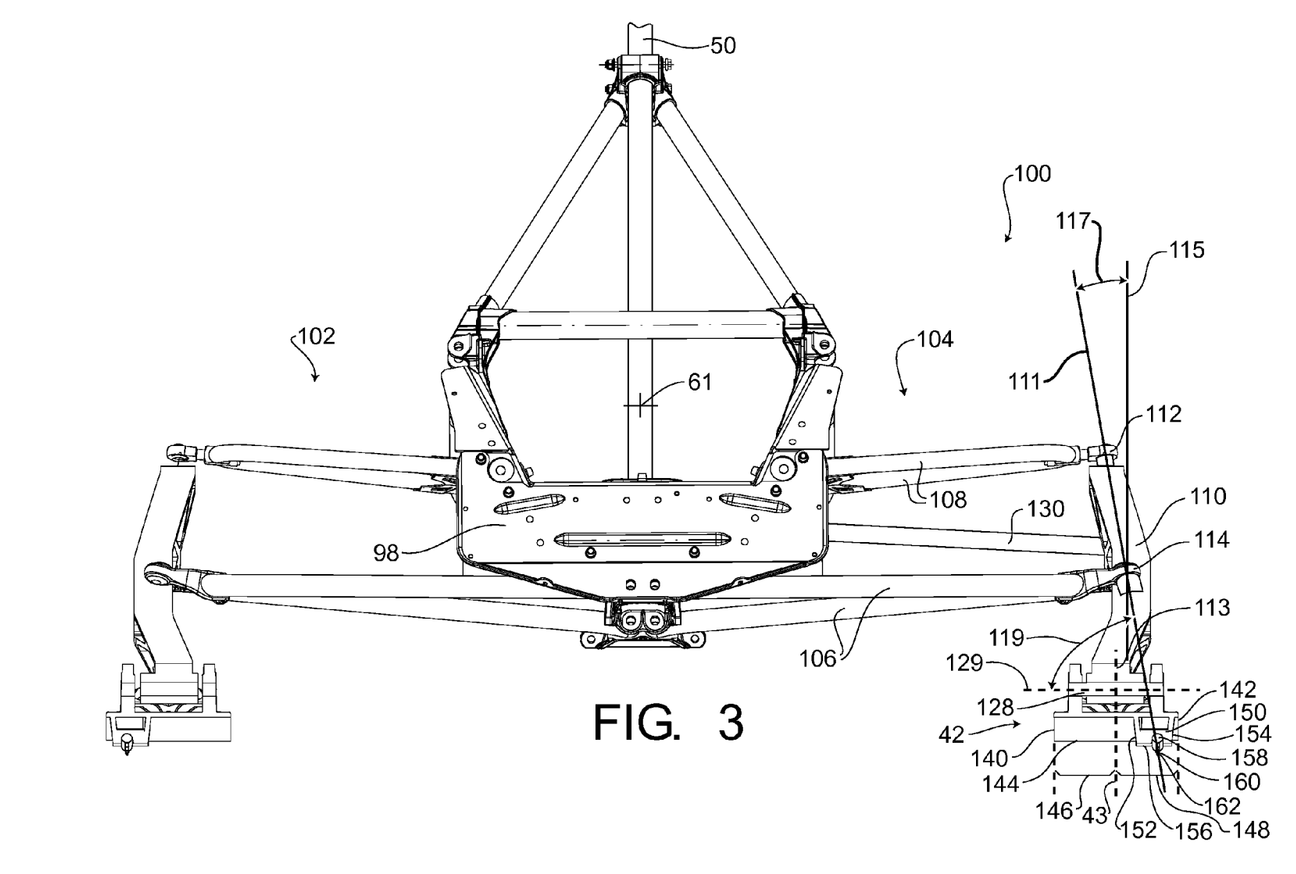
FIG. 3 is a front elevation view of a frame and front suspension and ski assembly of FIGS. 2 with a portion of the front suspension and ski assembly shown in cross-section.
Figure 4:
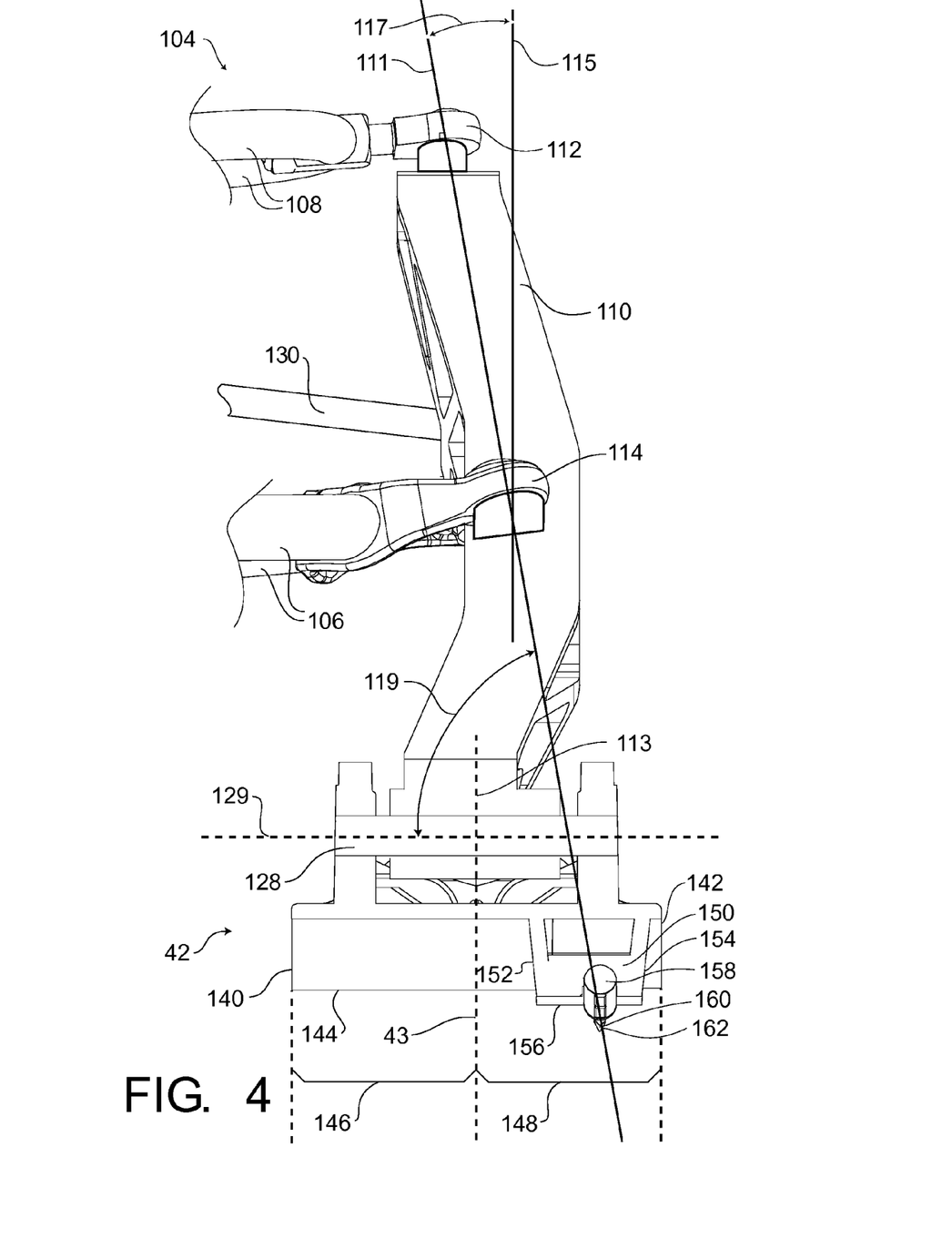
FIG. 4 is a close-up view of the left side of the front suspension and ski assembly of FIG. 3.

With reference to FIGS. 2, 3 and 4, there is shown a suspension and ski assembly 100 of a snowmobile 30 in accordance with a first embodiment of the invention mounted to the front portion 98 of frame 36 with all other components of the snowmobile removed for ease of reference and clarity. The front suspension and ski assembly 100 includes a right side double A-arm assembly 102 and a left side double A-arm assembly 104. Since the right side and the left side double A-arm assemblies 102 and 104 are mirror images of each other, same reference numbers will be used for the components of the right and left double A-arm assemblies 102 and 104 with the understanding that both sides of the front suspension and ski assembly 100 include similar components and operate in a similar fashion.

The left side double A-arm assembly 104 includes a lower A-arm 106 and an upper A-arm 108. The distal end of upper A-arm 108 is connected to the upper portion of the spindle 110 via a first ball joint 112 and the distal end of the lower A-arm 106 is connected to the middle portion of the same spindle 110 via a second ball joint 114 (see FIGS. 3 and 4). The ball joints 112 and 114 allow for rotational movement of the spindle 110 relative to the upper and lower A-arms 106, 108 about multiple axes such that the spindle 110 can rotate about a steering axis 111 passing through ball joints 112 and 114 and can move up and down throughout the A-arms 106, 108 range of movement. The proximal ends of the lower A-arm 106 are pivotally connected to the lower portion of the front portion 98 of frame 36, very near the central longitudinal axis 61 of the snowmobile 30. The proximal ends of the upper A-arm 108 are pivotally connected to the upper portion of the front portion 98 of frame 36. Each A-arm typically includes a front bar and a rear bar. The front and rear bars are joined and fixed together at their distal ends which is rotatably connected to the spindle 110. The proximal ends of the front and rear bars are spaced apart thus forming a roughly triangular, "V" or "A" shape. Each A-arm has therefore two mounting points on the frame and one joint on the spindle 110. The broad end of the "A" attaches to the frame 36 and the narrow end attaches to the spindle 110. "A-arm" is the term commonly used to designate a suspension arm having a roughly triangular, "V" or "A" shape. As those skilled in the art would be aware, the A-arm may not be "A" shaped but rather "V" shaped or generally triangular.

The ski 42 has a centerline 43 and is connected to the lower portion of the spindle 110 via a pivot pin 128 such that the ski 42 can pivot about the pivot axis 129 to glide along and over bumps and follow the contours of the terrain when the snowmobile is moving. The lower portion of the spindle 110 connected with the ski 42 has a longitudinal centerline 113 aligned with the centerline 43 of the ski 42. This is contemplated that the centerlines 113 and 43 may be offset from each other. The distal end of the steering rod 130 is connected to the spindle 110 via a ball joint (not shown). The pivot pin 128 rigidly connects the ski 42 to the spindle 110 in all other directions such that the steering motion of the spindle 110 is transferred to the ski 42 to steer the snowmobile 30 when the steering column 50 and steering rod 130 are activated. The lower A-arm 106 also includes mounting brackets for a spring/shock absorber assembly (not shown).

The ski 42 has an inner edge 140 generally facing toward a vertical plane passing through the centerline 61 of the snowmobile 30, and an opposite outer edge 142, and a ground facing surface 144. The ground facing surface 144 of the ski 42 comprises an inner surface 146 extending longitudinally from the centerline 43 of the ski 42 to the inner edge 140 of the ski 42 and an outer surface 148 extending longitudinally from the centerline 43 of the ski 42 to the outer edge 142 of the ski 42.

The keel 150 projects from and extends longitudinally along the ground facing surface 144 of the ski 42. The keel 150 is disposed substantially along the outer surface 148 of the ground facing surface 144 of the ski 42. The keel 150 has an inner lateral side 152 generally facing toward a vertical plane passing through the centerline 61 of the snowmobile 30, an opposite outer lateral side 154, and a ground facing surface 156.

The runner 158 projects from and extends longitudinally along the ground facing surface 156 of the keel 150. The runner 158 has a ground engaging portion 160.

In the embodiments of the invention shown in FIGS. 2, 3 and 4, the ski 42 and the keel 150 are integrally formed and the runner 158 is manufactured as a distinct part and may be connected to the keel 150 through various means that would be apparent for one skilled in the art.

As better shown in FIGS. 3 and 4, the first ball joint 112 and second ball joint 114 are not laterally aligned and the steering axis 111, which extend through centers of the first ball joint 112 and second ball joint 114, is therefore not parallel to the vertical line 115 passing through the second ball joint 114. Rather, the first ball joint 112 is slightly closer to the frame 36 of the snowmobile 30 than the second ball joint 114 such that the steering axis 111 is angled and extends to a point 162 within the ground engaging portion 160 of the runner 158. As such, the steering axis 111 defines a first acute angle 117 with the vertical line 115 and a second acute angle 119 with the pivot axis 129.

The generally curved or "reversed-C" shape of the spindle 110 permits both the above described disposition of the first ball joint 112 and second ball joint 114 in order to obtain an angled steering axis 111, and the previously described centering of the lower portion of the spindle 110 with the ski 42. In alternative embodiments of the invention, the spindle 110 may have any other shape allowing such disposition of the ball joints 112 and 114 and the mounting of the lower portion of the spindle 110 to the ski 42.

In the embodiment of the invention described above, having the keel 150 and runner 158 disposed along the outer surface 148 of the ground facing surface 144 of the ski 42 allows to increase the ski stance of the snowmobile 30, hence its turning stability, without having to increase the overall distance between the outer surfaces of the skis 42. Meanwhile, the disposition of the first ball joint 112 and second ball joint 114 results in the steering axis 111 and the runner 158 reaching the ground at a common point, i.e. point 162.

Figure 5:
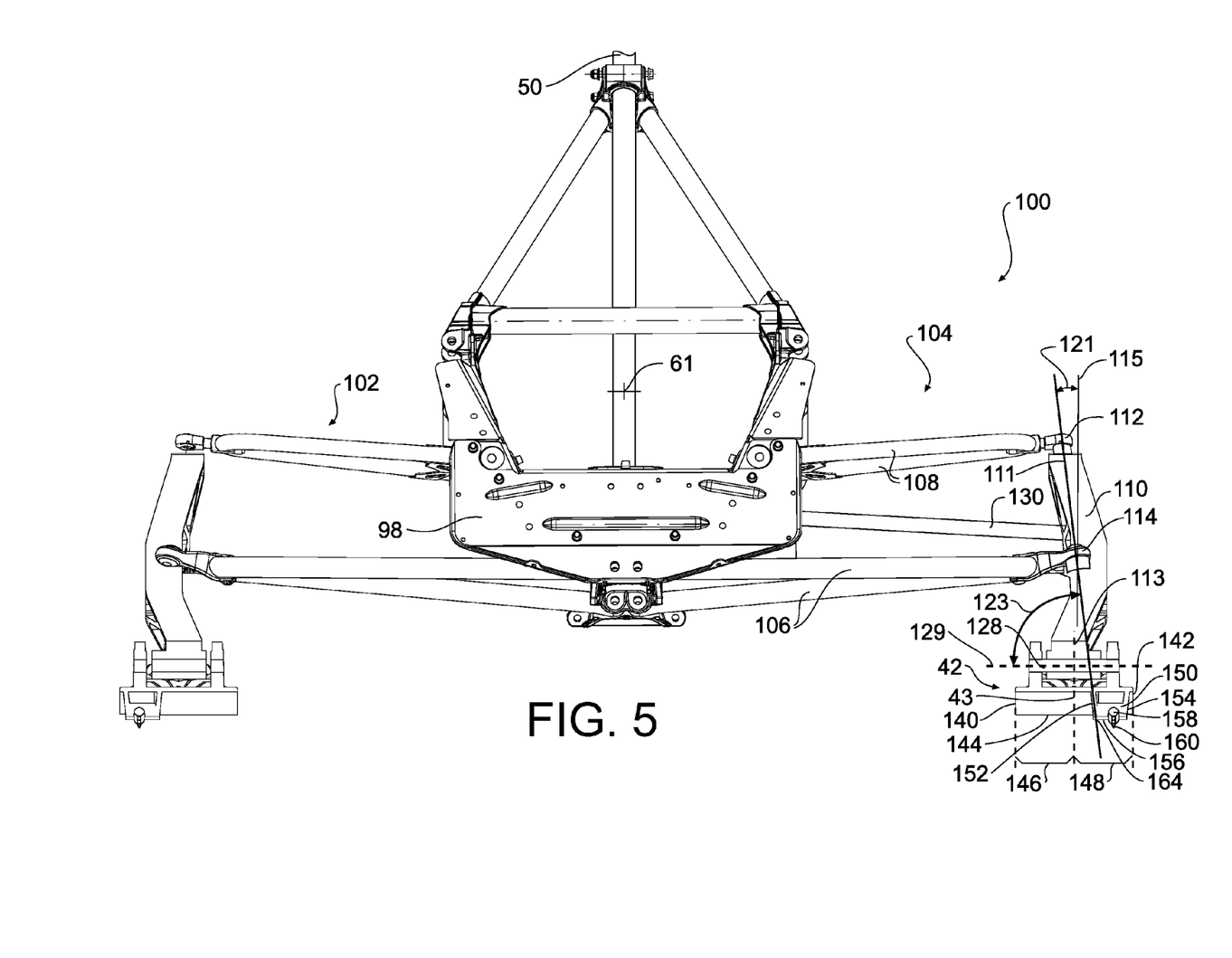
FIG. 5 is a front elevation view of a second embodiment of a frame and front suspension and ski assembly of the snowmobile of FIG. 1.

FIG. 5 illustrates a second embodiment of the invention. In this embodiment of the invention, due to the disposition of the first ball joint 112 and second ball joint 114 on the spindle 110 and/or the lengths of A-arms 106 and 108, the steering axis 111 is still angled and still define acute angles 121 and 123 with the vertical line 115 and the pivot axis 129 respectively, but the steering axis 111 does not extend to the point 162 within the ground engaging portion 160 of the runner 158. In this embodiment of the invention, the steering axis 111 extends to a point 164 within the ground facing surface 156 of the keel 150 between the inner lateral side 152 of the keel 150 and the runner 158.

In this second embodiment of the invention, straight-line stability of the snowmobile 30 is further improved through inducement of what is known to those skilled in the art as a slight "toe-out" of the skis 42. This means that when the snowmobile 30 is driven in straight-line, each ski will be constantly pressured to turn slightly outward.

Modifications and improvement to the above described embodiments of the present invention may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What is claimed is:

1. A front suspension and ski assembly for a snowmobile having a frame, the front suspension and ski assembly having a right and a left side each comprising:
   an upper arm pivotally connected to the snowmobile frame;
   a lower arm pivotally connected to the snowmobile frame;
   a spindle having an upper portion rotatably connected to the upper arm at a first connection point, a mid-portion rotatably connected to the lower arm at a second connection point, and a lower portion;
   a ski pivotally connected to the lower portion of the spindle at a third connection point, the ski pivoting about a first pivot axis extending from the third connection point, the ski having a longitudinally extending centerline, an inner edge, an opposite outer edge, and a ground facing surface facing the ground when the front suspension and ski assembly is in use;
   the ground facing surface of the ski comprises an inner surface extending longitudinally from the centerline of the ski to the inner edge of the ski and an outer surface extending longitudinally from the centerline of the ski to the outer edge of the ski;
   a keel projecting from and extending longitudinally along the ground facing surface of the ski and disposed along the outer surface of the ground facing surface of the ski, the keel having an inner lateral side, an opposite outer lateral side, and a ground facing surface;
   a runner projecting from and extending longitudinally along the ground facing surface of the keel, the runner having a ground engaging portion;
   wherein a straight line extending through the first connection point and the second connection point extends to a point disposed within the ground engaging portion of the runner, the straight line defining an acute angle with the first pivot axis.

2. The front suspension and ski assembly for a snowmobile of claim 1, wherein for each side of the front suspension and ski assembly:
   the straight line defines an acute angle with a vertical line passing through the second connection point.

3. The front suspension and ski assembly for a snowmobile of claim 1, wherein for each side of the front suspension and ski assembly:
   the first pivot axis extends horizontally from the third connection point.

4. The front suspension and ski assembly for a snowmobile of claim 1, wherein for each side of the front suspension and ski assembly:
   a lower portion of the spindle connected with the ski has a longitudinal centerline being aligned with the centerline of the ski.

5. The front suspension and ski assembly for a snowmobile of claim 1, wherein for each side of the front suspension and ski assembly:
   the upper arm and the lower arm are A-arms.

6. The front suspension and ski assembly for a snowmobile of claim 1, wherein for each side of the front suspension and ski assembly:
   the ski and keel are integrally formed.

7. A front suspension and ski assembly for a snowmobile having a frame, the front suspension and ski assembly having a right and a left side each comprising:
- an upper arm pivotally connected to the snowmobile frame;
- a lower arm pivotally connected to the snowmobile frame;
- a spindle having an upper portion rotatably connected to the upper arm at a first connection point, a mid-portion rotatably connected to the lower arm at a second connection point, and a lower portion;
- a ski pivotally connected to the lower portion of the spindle at a third connection point, the ski pivoting about a first pivot axis extending from the third connection point, the ski having a longitudinally extending centerline, an inner edge, an opposite outer edge, and a ground facing surface facing the ground when the front suspension and ski assembly is in use;
- the ground facing surface of the ski comprises an inner surface extending longitudinally from the centerline of the ski to the inner edge of the ski and an outer surface extending longitudinally from the centerline of the ski to the outer edge of the ski;
- a keel projecting from and extending longitudinally along the ground facing surface of the ski and disposed along the outer surface of the ground facing surface of the ski, the keel having an inner lateral side, an opposite outer lateral side, and a ground facing surface;
- a runner projecting from and extending longitudinally along the ground facing surface of the keel, the runner having a ground engaging portion;
- wherein a straight line extending through the first connection point and the second connection point extends to a point disposed within the ground facing surface of the keel between the inner lateral side of the keel and the runner, the straight line defining an acute angle with the first pivot axis.

8. The front suspension and ski assembly for a snowmobile of claim 7, wherein for each side of the front suspension and ski assembly:
- the straight line defines an acute angle with a vertical line passing through the second connection point.

9. The front suspension and ski assembly for a snowmobile of claim 7, wherein for each side of the front suspension and ski assembly:
- the first pivot axis extends horizontally from the third connection point.

10. The front suspension and ski assembly for a snowmobile of claim 7, wherein for each side of the front suspension and ski assembly:
- a lower portion of the spindle connected with the ski has a longitudinal centerline being aligned with the centerline of the ski.

11. The front suspension and ski assembly for a snowmobile of claim 7, wherein for each side of the front suspension and ski assembly:
- the upper arm and the lower arm are A-arms.

12. A snowmobile, comprising:
- a frame having a front portion and a rear portion;
- a drive track disposed below and supporting the rear portion of the frame;
- an engine mounted on the frame;
- a drive train operatively interconnecting the engine with the drive track for delivering propulsive power to the drive track;
- a front suspension and ski assembly having a right and a left side each comprising:
  - an upper arm pivotally connected to the snowmobile frame;
  - a lower arm pivotally connected to the snowmobile frame;
  - a spindle having an upper portion rotatably connected to the upper arm at a first connection point, a mid-portion rotatably connected to the lower arm at a second connection point, and a lower portion;
  - a ski pivotally connected to the lower portion of the spindle at a third connection point, the ski pivoting about a first pivot axis extending from the third connection point, the ski having a longitudinally extending centerline and having an inner edge facing the frame of the snowmobile, an opposite outer edge, and a ground facing surface facing the ground when the front suspension and ski assembly is in use;
  - the ground facing surface of the ski comprises an inner portion extending longitudinally from the centerline of the ski to the inner edge of the ski and an outer surface extending longitudinally from the centerline of the ski to the outer edge of the ski;
  - a keel projecting longitudinally from the ground facing surface of the ski and disposed along the outer surface of the ground facing surface of the ski, the keel having an inner lateral side facing the frame of the snowmobile, an opposite outer lateral side, and a ground facing surface;
  - a runner projecting from and extending longitudinally along the ground facing surface of the keel, the runner having a ground engaging portion;
  - the upper arm, the lower arm and the spindle being disposed such that a straight line extending through the first connection point and the second connection point extends to a point disposed within the ground engaging portion of the runner, the straight line defining an acute angle with the first pivot axis; and
- a steering assembly mounted on the frame and operatively connected to the spindles of each side of the front suspension and ski assembly.

* * * * *